(12) United States Patent
Rump et al.

(10) Patent No.: US 7,008,596 B1
(45) Date of Patent: Mar. 7, 2006

(54) DEVICE FOR PREPARING A PLASMA FOR THE PRODUCTION OF OZONE AND/OR OXYGEN IONS IN THE AIR

(75) Inventors: Hanns Rump, Hausen (DE); Olaf Kiesewetter, Geschwenda (DE)

(73) Assignee: Automotive AG, Vaduz (LI)

( * ) Notice: Subject to any disclaimer, the term of this patent is extended or adjusted under 35 U.S.C. 154(b) by 0 days.

(21) Appl. No.: 10/030,731

(22) PCT Filed: Jul. 6, 2000

(86) PCT No.: PCT/DE00/02164

§ 371 (c)(1),
(2), (4) Date: Feb. 11, 2002

(87) PCT Pub. No.: WO01/02291

PCT Pub. Date: Jan. 11, 2001

(30) Foreign Application Priority Data

Jul. 7, 1999 (DE) ................................ 199 31 366

(51) Int. Cl.
*B01J 19/08* (2006.01)
(52) U.S. Cl. ............................. 422/186.07; 422/186.04
(58) Field of Classification Search ........... 422/186.07, 422/186.04
See application file for complete search history.

(56) References Cited

U.S. PATENT DOCUMENTS

| 3,954,586 A | 5/1976 | Lowther |
| 4,049,707 A | 9/1977 | Harter et al. |
| 4,737,885 A | 4/1988 | Akutsu |
| 6,136,278 A * | 10/2000 | Eliasson et al. ........ 422/186.04 |

FOREIGN PATENT DOCUMENTS

| DE | 3424889 | 2/1986 |
| EP | 0537613 | 4/1993 |

OTHER PUBLICATIONS

Patent Abstracts of Japan (Nichimen Denshi R & AMP. DKK) vol. 1997 No. 03 Mar. 31, 1997 & JP 08310801A. Nov. 26, 1996 Abstract.
Patent Abstracts of Japan vol. 1996 No. 07 Jul. 31, 1996 & JP 08 081205A (Toshiba Corp) Mar. 26, 1996 Abstract.
Patent Abstracts of Japan vol. 014 No. 453 (C-0764) Sep. 28, 1990 & JP 02180703A (Noritake Co Ltd) Jul. 13, 1990 Abstract.

* cited by examiner

*Primary Examiner*—Kishor Mayekar
(74) *Attorney, Agent, or Firm*—Horst M. Kasper

(57) ABSTRACT

A device for the preparation of a plasma for producing ozone and/or oxygen ions in the air following the principle of dielectrically impeded discharge is disclosed. The device comprises: a) a flat, electrically insulating support (1, 7), the material thereof having a dielectric constant $\epsilon_r$ which is at least higher than 30 (that is, $\epsilon_r >$ thirty); b) an electrode (4) is placed on one of the main surfaces of the support (1, 7), c) at least one electrically insulating layer (2, 8) made of a dielectric material is placed on the other side of the support (1,7); d) the dielectric constant of the support (1, 7) and that of the insulating layer (2, 8) are different, e) an electrode (3, 10) made of an electrically conductive material is mounted an the insulating layer (2, 8), said electrode covering only partially the insulating layer (2, 8) and a high voltage of an AC generator is applied to both electrodes (3, 4).

21 Claims, 2 Drawing Sheets

Figure 1:
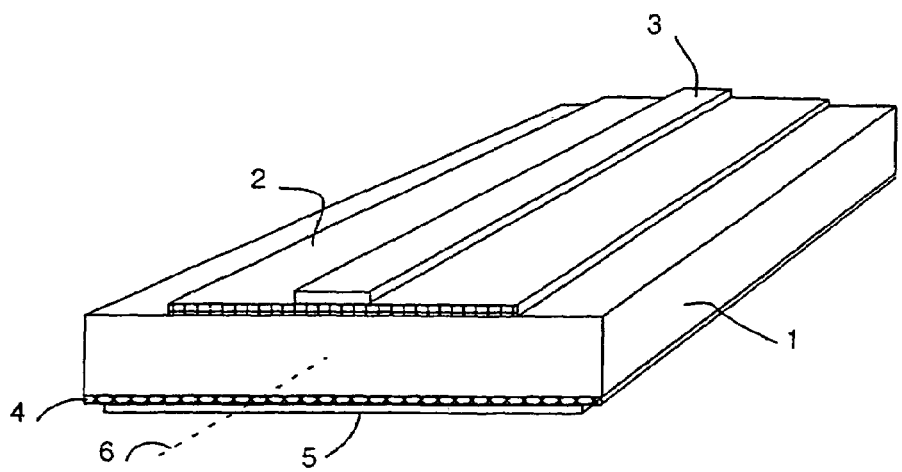

DEVICE FOR PREPARING A PLASMA FOR THE PRODUCTION OF OZONE AND/OR OXYGEN IONS IN THE AIR

This application is a 35 U.S.C. 371 National stage filing of PCT/DE/02164 on Jul. 6, 2000.

TECHNICAL AREA

The invention relates to a device to generate a plasma for the production of ozone and/or oxygen ions in the air, based an the principle of dielectrically impeded discharge, with two electrodes to which a high voltage from an alternating voltage generator is applied and between which an electrically insulating element is situated.

STATE OF THE ART

The generation of ozone by producing a plasma based on the principle of dielectrically impeded discharge has been known for about 100 years. Especially the Siemens tube is used in systems for the oxidative treatment of air for purposes of odor control and for killing air-borne bacteria. Here, the objective is to destroy oxidizable air components by treating the air with oxygen ions and with ozone ($O^-$ and $O_3$).

With the Siemens tube, there is a tubular glass element, preferably made of borosilicate or of quartz glass, whose inside is lined with an electrode made of conductive material that lies against the inside glass surface tightly and, if possible, without an air gap. The outer shell of the tube forms a likewise tight-fitting net that is made, for example, of steel mesh, which constitutes the outer electrode. When a high alternating voltage, for example, 3 to 6 kV, is applied to the inner and outer electrodes, then electric discharge phenomena occur. In this process, ions and ozone ($O^-$ and $O_3$) are generated.

WO/98/26482 discloses a flat module that is structured according to the same physical principle with which an electrode is enclosed between two glass plates. A metal grid or metal net covers the outer glass surfaces, which are accessible to the air, thus forming the outer electrode. The high alternating voltage is connected to the outer and inner electrodes whereby, according to the invention, the earth potential is always an the out side or rather, on the side that could be touched.

A drawback of this construction as well as of the Siemens tube is the relatively large and costly structure since the outer and the inner electrodes have to fit tightly and without interstices against the glass dielectric. An industrial, cost-effective production of these modules is difficult. Moreover, the efficiency drops if the surface of the glass and the structures between the outer wire nets are dirty. It appears that it is possible to improve the efficiency of this technology when it comes to air-related applications if the physical mechanism of action is taken into account.

The function of the dielectrically impeded electric discharge can be explained as follows: between the electrodes—which are connected to a high alternating voltage, for example, 5 kV at a frequency of 30 kHz—there is a dielectric, usually made of glass. The general function of the two dielectric barriers is to impede and ultimately to interrupt the movement of the electrons to the electrode. After all, the movement of the electrons to the anode is not only stopped by the dielectric, but the electrons are accumulated, as a result of which an opposite field to the outer field driving the electron flow is formed which, in turn, continues to grow until the outer field and the opposite field just barely compensate for each other and consequently the electron flow comes to a halt (mirror charge).

The switching properties of the barrier are determined by the geometrical circumstances of the resulting condenser as well as by the material properties of the dielectric. By suitably selecting the parameters, extremely fast but especially reliable discharge interruptions can be achieved. These are of essential importance in the dielectrically impeded discharges since they contribute considerably to the fact that the discharge plasma does not develop abruptly in the direction of a thermal equilibrium.

In fact, the opposite is supposed to be achieved: as many fast electrons as possible are to be generated which transfer their kinetic energy by means of inelastic collisions to the atomic states that contribute most effectively to the desired plasma and ozone generation, whereby the energy transfer through electron collisions in dissipation channels should be kept as low as possible.

The resulting appearance of the discharges with power densities relevant for application cases is marked by the occurrence of individual discharges, the so-called filaments. These filaments occur briefly and in large numbers. They are normally distributed over the entire electrode surface area and, locally as well as temporally, they are of a stochastic nature.

Physically, the phenomenon can be described in such a way that, with increasing external voltage, somewhere in the discharge area at unpredictable points in time, conditions are present that lead to locally limited discharges. Through the dielectric impedance of the electrodes, these discharges are extinguished shortly after their formation as a result of the local opposite fields (mirror charges). Additional, subsequent individual discharges occur and are extinguished according to the same principle.

The filaments found on the outer wire grids of a Siemens tube are relatively small. The dielectric is enclosed by the rear electrode and by the outer electrode, which is configured as a wire grid. During the discharge, the luminous filaments can be observed in the direct vicinity of the wires, which strive towards the dielectric. These filaments are only a few tenths of a millimeter long.

The disadvantage of the technology that works with wire nets is also that the wires have to be arranged at a minimum distance, the mesh size, from each other. If the mesh size is too small, the charges impede each other; moreover, ozone and oxygen ions cannot be freely transported away into the ambient air.

Therefore, it would be ideal to have a structure that would produce practically flat filaments which would then be in direct contact with the ambient air. Here, it would also be desirable for the electric alternating field to project into the space since it is known that, in a fast electric alternating field, especially polar molecules are dissociated.

Moreover, DE-A 3424889 describes an electrode for a gas discharge reactor having a metal layer as the discharge electrode that is covered with a ceramic dielectric. The dielectric has a glass-like coating an its side facing away from the metal layer, whereby the dielectric constant of the coating is higher than that of the dielectric. There is a counter-electrode situated opposite from the discharge electrode, whereby the process gas that is supposed to be chemically changed by the plasma discharge flows between the two electrodes. The glass-like coating serves to fill the microfine pores in the surface of the dielectric and to give the dielectric a smooth outer surface, which is why the coating is only a few micrometers thick.

TECHNICAL OBJECTIVE

The invention is based on the objective of creating a device of the type described above that avoids the disadvantages portrayed above and with which especially ozone and oxygen can enter the ambient air freely and unimpeded, and can be transported away with it.

DISCLOSURE OF THE INVENTION AND ITS ADVANTAGES

The objective is achieved with a device of the type described above with the characterized in that
a) the element is a flat, electrically insulating carrier (1,7), whose material has a dielectric constant $\epsilon_{r\ carrier}$ that is at least greater than 50 (in words, $\epsilon_{r\ carrier}$>fifty);
b) a flat electrode (4), lower electrode (4), made of an electrically conductive material, is applied onto one of the main surfaces of the carrier (1,7), the rear;
c) at least one band-shaped electric insulating layer (2,8) made of a dielectric material is applied onto the other main surface of the carrier (1,7), the front, which is exposed to the air, whereby the insulating layer (2,8) only partially covers the front of the carrier (1,7),
d) the dielectric constant of the carrier and that of the insulating layer are different, whereby the difference between the dielectric constants of the carrier and of the insulating layer or of the partial layers is selected in such a way that the mirror discharge effect occurs;
e) an electrode, the upper electrode, made of an electrically conductive material that only partially covers the insulating layer, is likewise situated on the insulating layer;
f) a high voltage from an alternating voltage generator is applied to the two electrodes.

The advantage of the device according to the invention is, for one thing, that ozone and oxygen can enter the ambient air freely and unimpeded, and can be transported away with it. Secondly, the device—in contrast to devices of the state of the art—is small and consequently, can be used in numerous small devices, especially mobile devices. Moreover, the design according to the invention of the insulating layer as well as of the electrode of the device situated on said insulating layer results in practically flat filaments that are in direct contact with the ambient air. In an advantageous manner, the electric alternating field projects into the space, which is the case because, in a fast electric alternating field, especially polar molecules are dissociated.

The invention utilizes the fact that different materials have different dielectric constants. When these materials are used according to the invention as flat, layered elements or structures, this results in new effects, which have not been observed before.

In order to increase the efficiency, the insulating layer in an exemplary embodiment of the invention advantageously consists of several electrically insulating partial layers whose dielectric constants decrease as the distance from the carrier increases, so that the top partial layer has the smallest dielectric constant of the partial layers, whereby the upper electrode is arranged an the top partial layer. In the structure of consecutive partial layers, the different dielectric constants are likewise a condition in order to be able to create the mirror charge effect. In summary, however, the term dielectric barrier will be used below to mean that the insulating layer can either be a layer in one piece or can consist of several partial layers.

In this teaching according to the invention, the double dielectric barrier—namely, formed by the carrier, for example, made of ceramic, glass or polyamide an the one hand, as the first dielectric and by the insulating layer applied to said carrier an the other hand as the second dielectric, which is preferably band-shaped and is a thin dielectric layer made, for example, of glass, ceramic, metal oxide, polyamide, thermoplastic, thermoset plastic—functions according to the following physical law; if a high electric alternating voltage is applied, then the electric field—virtually unimpeded by the thin layer or layers—can build up between the outer electrodes.

When the field strength approaches the ignition voltage, because of the double dielectric barrier, the quickly growing mirror charge between the electrodes prevents a direct continuous discharge through the dielectrics or layers. An ion channel in the air—the dielectric constant of air is practically 1—along the surface of the thin dielectric barrier, however, can easily be ignited, which explains the numerous individual filaments that can be observed an the surface of the barrier.

The filaments, which are relatively long at about 2 mm, extend through the air, starting from the upper electrode situated mid-symmetrically on the insulating layer or centered an the surface of the insulating layer, towards the outer edge of said insulating layer. The mirror charge in the dielectric of the insulating layer prevents a direct breakdown, whereas in contrast, the low relative permittivity in the air allows the discharge through the air path, directly an the surface of the insulating layer, such as a glass layer.

An important aspect for the function of the device as an ozone and ion generator is the advantageously large surface area of the insulating layer that is covered by filaments which are directly exposed to the ambient air.

In a preferred example of a device with a dielectric constant $\epsilon_r$ of the carrier that is at least greater than 30, the insulating layer has a dielectric constant $\epsilon_r$ between less than 30 and about 5, whereby, if several insulating layers are present, their dielectric constants are configured so as to be graduated between less than 30 and about 5, decreasing towards the outside. If the dielectric constant $\epsilon_r$ of the carrier is greater than 50, then the insulating layer has a dielectric constant $\epsilon_r$ between less than 50 and about 5, whereby, if several insulating layers are present, their dielectric constants are once again configured so as to be graduated between less than 50 and about 5, decreasing towards the outside.

The distance or the difference of the dielectric constants of the carrier and of the insulating layer or of the partial layers has to be selected in such a way that the mirror discharge effect occurs.

In preferred examples, the carrier and the insulating layer or insulating layers are made of a ceramic material ($Al_2O_3$) or glass, for example, polysilicon or amorphous silicon, or of an organic plastic, for example, polyamide, whereby the insulating layer can optionally also be made of an oxidic material, for example, a metal oxide such as zinc oxide.

In another embodiment, the thickness of the insulating layer or insulating layers is less than the thickness of the carrier, whereby the thicknesses are preferably in a ratio of 1:4 to 1:25.

In order to increase the efficiency of the device, according to the invention, one or more very thin dielectric layers can be applied to the insulating layer so that the latter consists of several partial layers, whereby it is a condition that the dielectric constants of the layers must be different in order to be able to create the effect of the so-called mirror charge. (For the sake of easier reading, only one single additional dielectric barrier will be referred to below.)

Therefore, as the insulating layer or insulating layers, preferably films made of organic, electrically insulating plastics, for example, made of polyamide or of thermoplastic or thermoset plastic or acrylate or polymers, can be used, whereby, when several films are employed, their dielectric constants are graduated.

The carrier has an elongated-flat, preferably rectangular format, whereby, as an advantageous embodiment of the invention, the lower electrode, which is situated directly on the carrier, covers the rear of the carrier over a large surface area, preferably completely or almost completely, and is situated centered on said carrier, whereby the insulating layer located on the front of the carrier as well as the upper electrode located on the insulating layer extend along the longitudinal axis of the carrier, each in the form of a band centered on the carrier or on the insulating layer; here, the surface area of the lower electrode is larger than the surface area of the insulating layer.

Both electrodes can be designed as grids or nets, whereby the surface area of the lower electrode is larger than the surface area of the upper electrode.

By the same token, the insulating layer and the upper electrode situated an it can be situated an the carrier so as to be structured in a meander-shaped or finger-shaped or comb-like way, whereby the upper electrode runs mid-symmetrically an the insulating layer and the surface area of the lower electrode is likewise larger than the surface area of the upper electrode.

When a high electric alternating voltage, for example, 5 kV with a frequency of about 30 kHz, is applied to the upper and the lower electrodes, the result is a continuous electric discharge of the electric field that is forming, whereby discharge channels move in the air on the surface of the dielectric insulating layer away from the top, preferably band-shaped electrode, towards the edge of the insulating layer. The discharge channels, filaments, which continuously build up anew, are at a distance of about 0.1 mm from each other, so that, when they are viewed in a darkroom, a virtually continuous luminous band appears which, starting from the upper electrode situated mid-symmetrically or centered on the insulating layer, covers the surface of the meanders or fingers or teeth of the insulating layer, which is likewise preferably band-shaped.

With this structure, the problem can arise that, due to geometric tolerances, the current density in the filaments is not the same. The relatively high currents in the areas in which the air path of the discharge is smallest place a burden on the voltage supply and can lead to a reduction in the voltage of the alternating voltage generator. This can lead to the result that, in the areas where the air path is longest, the discharges are no longer possible.

For this reason, it is proposed for another preferred embodiment of the invention that the electric voltage from the alternating voltage generator is fed into the upper electrode via at least one electric resistor, whereby, with the meander-shaped or finger-shaped or comb-like design of the upper electrode, such a resistor is present at each meander or finger or tooth as the supply point. If an unusually high activity of the filaments were to occur in one of the branches, the voltage in this branch would break down through the supply resistor. Therefore, as a result, a more uniform discharge activity is achieved with the coupling-in of the voltage via the resistors.

For the same reasons, now regarding another embodiment, it is advantageous that the upper electrode is made of a material with a lowered electric conductivity, namely, of an electrically semi-conductive material.

Therefore, advantageously in further embodiments, the upper electrode can be made of one of the following materials: either of graphite or charcoal or else semi-conductive, doped or undoped metal oxides such as zinc oxide, tin dioxide, tungsten trioxide, iron oxide.

In order to further increase the effect of the generation of the filaments, in other embodiments according to the invention, the upper electrode is selected from a material with the most mobile electrons possible, in order to enhance or reduce the work function of the electrons. Such materials with low electron work functions that can be used are, for example, barium titanate, barium-zirconium titanate, barium-gallium titanate or semi-conductive, doped metal oxides such as zinc oxide, tin dioxide, tungsten trioxide, iron oxide.

The high electric resistance that is also inherent to this material likewise leads to a natural limitation of the currents in the individual meanders or fingers or teeth of the corresponding structure of the insulating layer and of the upper electrode with the result of an equalization of the filaments over the surface.

The upper electrode can also consist of a metallic electrically conductive material. Moreover, the lower electrode, which consists, for example, of vapor-deposited platinum, can be insulated and passivated towards the outside with a very thin layer of glass, or else the lower electrode can be applied galvanically.

The surface area ratios of the upper electrode to the insulating layer to the carrier can be approximately 1:4:8. Here, the upper electrode and the insulating layer have a band-like structure and are each arranged on each other so as to be geometrically centered or mid symmetrically.

In order to cover the largest possible surface area of the insulating layer with filaments, another embodiment according to the invention proposes that two such devices are each joined with the rear lower electrodes on each other and with the insulating layers lying in-between to form a flat assembly, so that the electrodes are each on the outside. This achieves that both sides of one single compact and flat component, namely, a flat assembly, have the most active possible surface for the filaments to be generated.

Such a device to generate a plasma for the production of ozone and/or oxygen ions in the air, based on the principle of dielectrically impeded discharge, with two electrodes to which a high voltage from an alternating voltage generator is applied and between which an electrically insulating element is situated, is characterized in that a) the element consists of two flat, electrically insulating carriers, whose materials each have a dielectric constant $\epsilon_{r\ carrier}$ that is greater than 50 (in words, $\epsilon_{r\ carrier}$>fifty) or at least greater than 30 (in words, $\epsilon_{r\ carrier}$>thirty), and which are each joined with one of their main surfaces, rear, layered an each other, and between them, there is a shared flat electrode made of an electrically conductive material, b) at least one band-shaped electric insulating layer made of a dielectric material is applied onto the other main surfaces of the carriers which are exposed to the air, whereby the insulating layer only partially covers the front of the carriers, c) the dielectric constant of the carriers and that of the insulating layers are different, whereby, at a dielectric constant of each of the carriers of $\epsilon_{r\ carrier}$>fifty, the dielectric constant of each of the insulating layers is between 50>$\epsilon_{r\ insulating\ layer}$>5 and, at a dielectric constant of each of the carriers of $\epsilon_{r\ carrier}$>thirty, the dielectric constant of each of the insulating layers is between $30 > \epsilon_{r\ insulating\ layer} > 5$, so that the mirror discharge effect occurs, d) a band-shaped electrode made of an electrically conductive material that only partially covers the insulating layers, is situated on each of the insulating layers, e) so that the two carriers with the shared electrode situated in-between and the insulating layers with the upper electrodes are joined to form a flat assembly.

It is irrelevant for the function of this arrangement whether the inner electrode is situated on each substrate layer and these substrate layers are glued or cemented to each other or whether only one single electrode is situated inside a so-called sandwich structure. For this reason, the flat assembly can advantageously have a sandwich-like structure with just one single inner electrode, which represents the lower electrode.

Another advantage of this configuration of the flat assembly is that the outer upper electrodes of the flat assembly, which can be touched from the outside, can be grounded or connected to the earth, so that only the inner, electrically insulated electrodes, which represent the lower electrode in the arrangement according to the invention, carry voltage vis-à-vis the zero potential (ground/earth), which is easier to handle as well as electrically safer.

If a flexible dielectric material such as, for example, a polyamide, which can also be fiberglass-reinforced, is used for the carrier, then a band-shaped device or flat assembly can be created that can be folded or rolled up into a suitable shape, thus giving rise to a very large active surface for the filaments along which the air can pass very closely. Thus, the carrier or carriers can be made of a flexible dielectric carrier material in order to form a band-shaped, rollable device or flat assembly.

The geometric arrangement of the electrodes can have a wide variety of free shapes. For example, the electrode structure of the two electrodes can be arranged on the carrier in any desired way. All of the embodiments have in common that there is a rear or lower electrode on a carrier made of suitable dielectric material, whereby on the opposite main surface of the carrier, which is exposed to the air, there are—preferably band-shaped—structures made of thin layers of one or more dielectric insulating layers that are layered an each other, in whose geometric center there are electrically conductive, preferably likewise band-shaped structures as the electrode or electrodes, whereby the dielectric constants of the carrier and insulating layer are different.

BRIEF DESCRIPTION OF THE DRAWING IN WHICH THE FOLLOWING IS SHOWN

Figure 2:
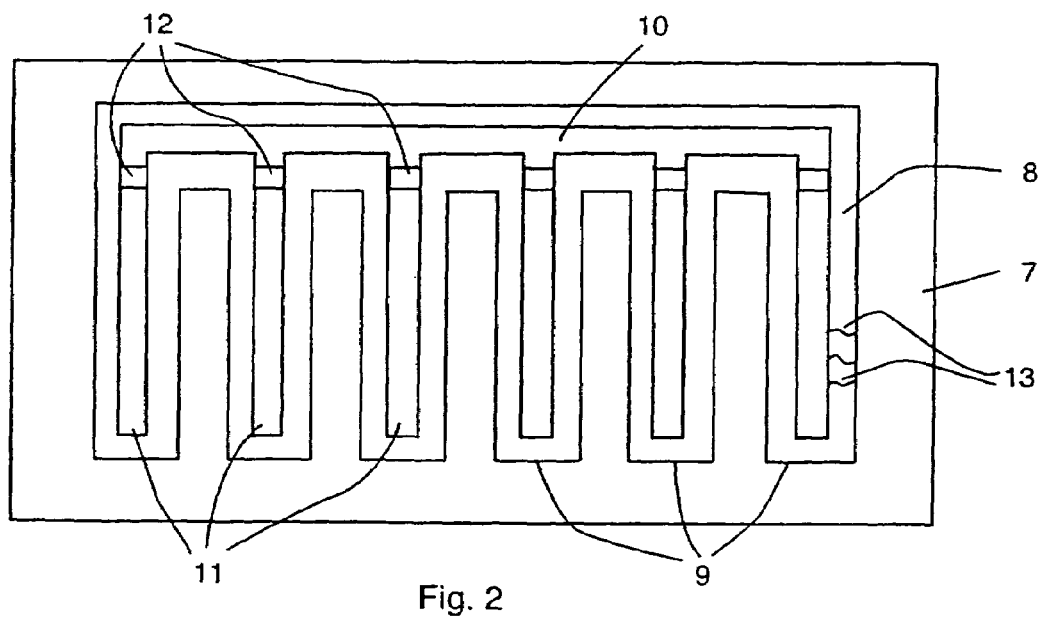
Figure 3:
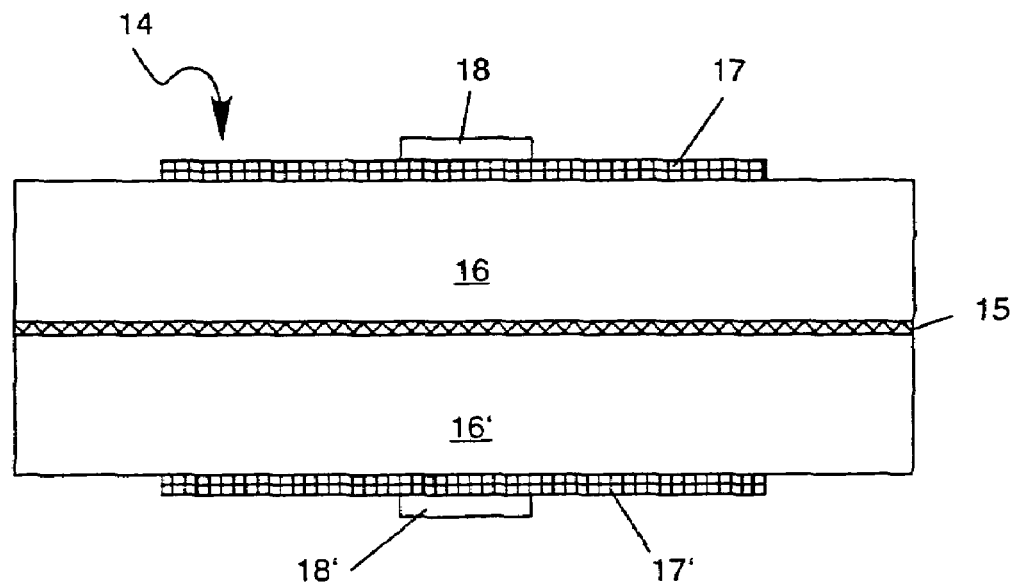
Figure 4:
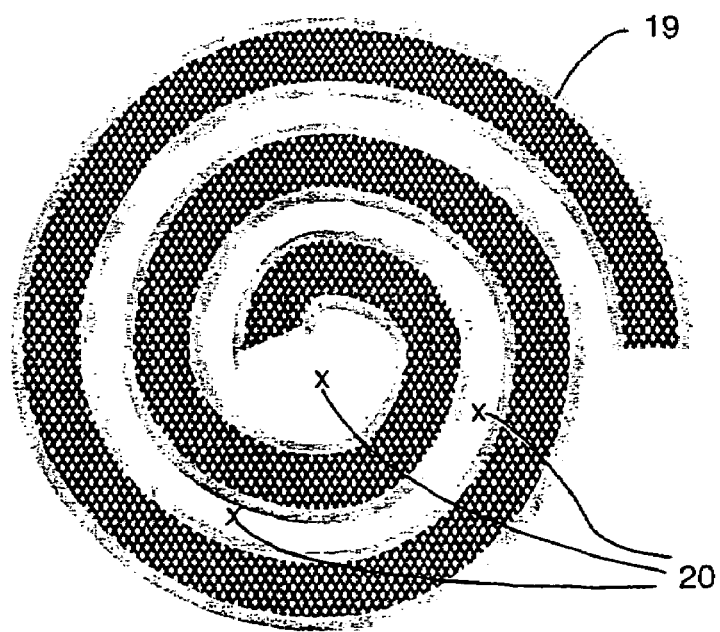

FIG. 1 a perspective representation of an elongated-flat device according to the invention in a preferred embodiment, FIG. 2 a top view of another preferred embodiment of a device in which the insulating layer and the upper electrode are comb-like in shape, FIG. 3 a flat assembly that is comprised of two of the devices of FIG. 1, and FIG. 4 a top view of another embodiment, which is wound as a spiral of flexible materials.

FIG. 1 shows a perspective view of a planar, elongated-flat device, consisting of a cuboidal carrier 1 as the dielectric, for example, made of a ceramic material; ceramic has a very high dielectric constant, for instance, of $\epsilon_r > 50\ 100$.

The carrier is about 0.7 mm to 1.0 mm thick and can be about 20 mm to 100 mm wide. The elongation direction is shown in FIG. 1 with a dashed line associated with the reference numeral "6".

A flat electrode 4, the lower electrode made, for example, of platinum, is vapor-deposited onto the bottom of the carrier 1; said electrode is insulated and passivated towards the outside by a very thin glass layer 5.

On the top of the carrier 1, there is a thin, band-shaped insulating layer 2 made of an other dielectric that consists, for example, of glass, polysilicon, amorphous silicon or metal oxides, e.g. zinc oxide, and that is preferably about 0.05 mm to 0.5 mm thick. The insulating layer 2, whose surface area is smaller than that of the lower electrode 4 located on the opposite main surface, is preferably situated geometrically centered or mid-symmetrically on the carrier 1.

On the insulating layer 2, there is an upper electrode 3 that, in terms of its surface area, is smaller than the surface area of the insulating layer; the upper electrode 3 is likewise situated centered or mid-symmetrically on the insulating layer 2. Preferably, with the above-mentioned dimensions, the upper electrode 3 can be between 1 mm and 5 mm wide. The upper electrode 3 is thus likewise band-shaped and consists of an electrically conductive substance, e.g. metal. The insulating layer 2 has a dielectric constant $\epsilon_r$ of about 5 to 30 and is selected in such a way that the dielectric constants of the carrier 1 and the insulating layer 2 are markedly different. The reference numeral 6 designates the longitudinal axis of the device.

FIG. 2 shows another preferred embodiment of the device according to the Invention, consisting of a carrier 7 with a lower electrode (situated below the drawing plane and not visible) an the lower main surface. A meander-shaped coating made of a dielectric as insulating layer 8 is applied onto the opposite upper main surface of the carrier 7 and said insulating layer 8 preferably has a thickness between about 0.1 mm and 0.2 mm.

The structure of this insulating layer 8 has been selected here to be comb-like with individual teeth 9 that are equidistant from each other. The rectangle that encloses the insulating layer 8 is situated centered an the carrier 7.

On the insulating layer 8, centered or mid-symmetrically on it, there is an electrically conductive upper electrode 10 that is configured corresponding to the comb-like structure of the insulating layer 8, whereby the electrode 10 is also preferably situated centered or mid-symmetrically on the insulating layer 8, thus forming electrode arms 11.

The surface area of the entire upper electrode 10 is smaller than the surface area of the insulating layer 8. Preferably, with the above-mentioned dimensions, the teeth 9 of the insulating layer 8 can have a width of about 4 mm to 6 mm, whereby then the electrode arms 11 on the teeth 9 can be between 0.5 mm and 2 mm wide.

The lower electrode (concealed in FIG. 2) can completely fill the lower main surface of the carrier 7 or else can likewise be configured as meanders, but these must have a greater width than the meanders 9 or teeth 9 formed by the second dielectric of the 25 insulating layer 8. The grid structure allows the virtually unimpeded formation of an electric field.

Preferably, the lower electrode consists of a thin metal layer that is vapor-deposited or applied galvanically. In order to keep the electric capacitances between the lower and 30 the upper electrodes 10 as small as possible, the lower electrode can also be configured as a net or grid structure.

However, this slightly reduces the electric capacitance. The voltage from an alternating voltage generator (not shown) is fed into the upper electrode 10 via high-ohmic resistors 12, coupling resistors, one of said resistors 12 being situated at the beginning of each electrode arm 11 of the upper electrode 10, as can be seen in FIG. 2. If an unusually high activity of the filaments were to occur in a branch or electrode arm 11, then the voltage in this branch would break down via the associated resistor 12. Through the coupling-in of the voltage via several resistors 12, a uniform discharge activity is achieved.

If a high electric alternating voltage of, for example, 5 KV at about 30 kHz is connected to the upper and the lower electrodes, the result is a continuous electric discharge of the electric field that is forming, whereby discharge channels 13 form which, starting at the upper electrode 10 and running through the insulating layer 8, move in the air an the surface of the insulating layer 8 away from the upper electrode 10 towards the edge of the insulating layer 8. The discharge channels 13, filaments, which constantly build up anew, are preferably at a distance from each other of about 0.1 mm, so that, when they are viewed in a darkroom, a virtually continuous luminous band appears which, starting from the upper band-shaped electrode 10 that is situated centered an the insulating layer 8, covers the free surface area of the meanders 9 or of the teeth 9 of the insulating layer 8.

FIG. 3 shows a view of a flat assembly 14 that is made up of two devices according to the invention corresponding to FIG. 1, which are laid an each other with the rear lower electrodes, which are designated there with the reference numeral 4, consequently forming an electrode 15, which now lies in-between as well as carriers 16, 16' and insulating layers 17, 17' in-between, corresponding to the carrier 1 and the insulating layer 2 of FIG. 1. Upper electrodes 18, 18' are situated an the outside of the flat assembly 14 which is thus structured sandwich-like with only one single inner electrode 15, which represents the lower electrode. The outer upper electrodes 18, 18' of the flat assembly 14, which can be touched from the outside, are electrically grounded or connected to the earth.

FIG. 4 shows a top view of another embodiment of the device according to the invention which is wound as a spiral 19 of flexible materials. The carrier or carriers as well as the insulating layer or insulating layers consist of flexible dielectric carrier materials in order to form a band-shaped, rollable spiral device or flat assembly. Air can flow through the spiral 19 (in the drawing plane), which is indicated by x s 20.

COMMERCIAL APPLICABILITY

The subject matter of the invention can be used commercially wherever ozone and/or oxygen ions in air have to be generated, especially to improve and sterilize breathing air on the basis of highly pronounced crack properties even vis-à-vis large molecules. The device according to the invention is planar and has small geometric dimensions, but it has a considerably enlarged plasma surface area that is in contact with the air, which greatly increases the ion and ozone production. By the same token, the device has a low flow resistance for the dispersal of the ozone in the air, favorable manufacturing costs and high efficiency. Likewise, the structures of the insulating layer as well as of the upper electrode can be manufactured within narrow limits, as a result of the service life is prolonged.

What is claimed is:

1. A device to generate a plasma for the production of ozone and/or oxygen ions in the air, based on the principle of dielectrically impeded discharge, with two electrodes (3, 4) to which a high voltage from an alternating voltage generator is applied and between which an electrically insulating element is situated, wherein
   a) the element consists of a flat, electrically insulating carrier (1, 7), whose material has a dielectric constant $\epsilon_{r\ carrier}$ which is greater than 50 (in words, $\epsilon_{r\ carrier}$>fifty) or at least greater than 30 (in words, $\epsilon_{r\ carrier}$>thirty),
   b) a flat electrode (4), as a lower electrode (4), made of an electrically conductive material, is applied onto a rear one of main surfaces of the carrier (1, 7),
   c) at least one electric insulating layer (2, 8) made of a dielectric material is applied onto the other main surface of the carrier (1, 7), the front, which is adapted to be exposed to air, wherein the insulating layer (2, 8) only partially covers the front of the carrier (1, 7),
   d) the dielectric constant of the carrier (1,7) and that of the insulating layer (2, 8) are different, wherein, at a dielectric constant of the carrier (1, 7) of $\epsilon_{r\ carrier}$>fifty, the dielectric constant of the insulating layer (2, 8) is between 50>$\epsilon_{r\ insulating\ layer}$>5 and, at a dielectric constant of the carrier (1, 7) of $\epsilon_{r\ carrier}$>thirty, the dielectric constant of the insulating layer (2, 8) is between 30>$\epsilon_{r\ insulating\ layer}$>5, for allowing a mirror discharge effect to occur, and
   e) a band-shaped electrode (3, 10), as an upper electrode (3), made of an electrically conductive material that only partially covers the insulating layer (2, 8), is directly situated on the insulating layer (2, 8).

2. The device according to claim 1, wherein the insulating layer (2, 8) consists of several electrically insulating partial layers whose dielectric constants decrease as a distance from the carrier (1, 7) increases, so that the top partial layer has the smallest dielectric constant of the partial layers, wherein the upper electrode (3, 10) is arranged on the top partial layer.

3. The device according to claim 1 or 2, wherein at a dielectric constant $\epsilon_r$ of the carrier that is at least greater than 30, the insulating layer (2, 8) has a dielectric constant $\epsilon_r$ between 5 and less than 30, whereby, if several insulating layers (2, 8) are present, their dielectric constants $\epsilon_r$ are graduated between 5 and less than 30.

4. The device according to claim 1, wherein the carrier (1, 7) and the insulating layer (2, 8) or the insulating layers are made of a ceramic material ($Al_2O_3$) or glass, polysilicon or amorphous silicon, or of an organic plastic, wherein the insulating layer (2, 8) can optionally also be made of an oxidic material.

5. The device according to claim 4, wherein the organic plastic is polyamide.

6. The device according to claim 4, wherein the oxidic material is metal oxide or zinc oxide.

7. The device according to claim 1, wherein the thickness of the insulating layer (2, 8) or of the insulating layers (2, 8) is less than the thickness of the carrier (1, 7), wherein the thicknesses are in a ratio of 1:4 to 1:25.

8. The device according to claim 1, wherein the insulating layer (2, 8) or insulating layers consist of films made of organic, electrically insulating plastics made of polyamide, of thermoplastic, thermoset plastic, or acrylate, wherein, when several films are employed, their dielectric constants are graduated.

9. The device according to claim 1, wherein the carrier (1, 7) has an elongated-flat rectangular format, wherein the lower electrode (4) that is situated directly on the carrier (1, 7) covers the rear of the carrier (1, 7) over a large surface area completely or almost completely, and is situated geometrically centered on said carrier, and in that the insulating layer (2, 8) located on the front of the carrier (1, 7) as well as the upper electrode (3, 10) located on the insulating layer (2, 8) extend along the longitudinal axis (6) of the carrier (1, 7), each in the form of a band geometrically centered on the carrier or on the insulating layer, wherein the surface area of the lower electrode is larger than the surface area of the insulating layer.

10. The device according to claim 1, wherein both electrodes (3, 4, 10) are designed as grids or nets, wherein the surface area of the lower electrode (4) is larger than the surface area of the upper electrode (3, 10).

11. The device according to claim 1, wherein the insulating layer (2, 8) and the upper electrode (3, 10) situated on it, which are structured in a meander-shaped or finger-shaped or comb-shaped way, can be situated geometrically centered on the carrier (1, 7), wherein the upper electrode (3, 10) likewise runs geometrically centered on the insulating layer (2, 8).

12. The device according to claim 11, wherein the voltage from an alternating voltage generator is fed into the upper electrode (3, 10) via an electric resistor (12), wherein, with the meander-shaped or finger shaped or comb-shaped design of the upper electrode (3, 10), such a resistor (12) is present at each meander or finger or tooth (11) as a supply point.

13. The device according to claim 1, wherein the upper electrode (3, 10) is made of a metallic electrically conductive material or of an electrically semi-conductive material.

14. The device according to claim 13, wherein the upper electrode (3, 10) is made of one of the following materials: graphite, charcoal or electrically conductive metal alloys with low electrode work functions, including barium titanate, barium-zirconium titanate, barium-gallium titanate or semi-conductive, dope metal oxides including zinc oxide, tin dioxide, tungsten trioxide, iron oxide.

15. The device according to claim 1, wherein the lower electrode (4) which consists of vapor-deposited platinum, is insulated and passivated towards the outside with a very thin layer of glass (5).

16. The device according to claim 1, wherein the surface area ratios of the upper electrode (3,10) to the insulating layer (2,8) to the carrier (1,7) can be approximately 1:4:8.

17. The device according to claim 1, wherein two such devices are each joined with the rear lower electrodes (15) on each other and with the insulating layers (17, 17') lying in-between to form a flat assembly (14), wherein the upper electrodes (18, 18') are each on the outside of the flat assembly (14).

18. The device according to claim 17, wherein the flat assembly (14) has a sandwich-like structure with just one single inner electrode (15), which represents the lower electrode (15).

19. The device according to claim 18, wherein the outer upper electrodes (18, 18') of the flat assembly (14), which can be touched from the outside, are connectable to ground or to the earth.

20. The device according to claim 1 or 17, wherein the carrier or carriers consist of a flexible dielectric carrier material in order to form a band-shaped, rollable spiral device (19) or flat assembly (19).

21. A device to generate a plasma for the production of ozone and/or oxygen ions in the air, based on the principle of dielectrically impeded discharge, comprising the following features:
  a) a flat, electrically insulating carrier (1, 7), whose material has a dielectric constant $\epsilon_r$ that is at least greater than 30 (in words, $\epsilon_r$>thirty),
  b) an electrode (4), as a lower electrode (4), made of an electrically conductive material, is applied onto one of main surfaces of the carrier (1, 7), the rear;
  c) at least one electric insulating layer (2, 8) made of a dielectric material is applied onto the other main surface of the carrier (1, 7), the front, which is configured to be exposed to air, wherein the insulating layer (2, 8) only partially covers the front of the carrier (1, 7),
  d) the dielectric constant of the carrier (1, 7) and that of the insulating layer (2, 8) are different, wherein the difference between the dielectric constants of the carrier (1, 7) and of the insulating layer (2, 8) or of partial layers is selected for allowing a mirror discharge effect to occur,
  e) an electrode (3, 10), as an upper electrode (3), made of an electrically conductive material that only partially covers the insulating layer (2, 8), is directly situated on the insulating layer (2, 8); and
  f) an alternating voltage generator configured to provide a high voltage to the two electrodes (3, 4).

* * * * *